(12) United States Patent
Iyer et al.

(10) Patent No.: US 6,744,810 B1
(45) Date of Patent: Jun. 1, 2004

(54) SIGNAL REPEATER FOR VOLTAGE INTOLERANT COMPONENTS USED IN A SERIAL DATA LINE

(75) Inventors: Venkatraman Iyer, Beaverton, OR (US); John Todd West, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/459,744

(22) Filed: Dec. 10, 1999

(51) Int. Cl.⁷ .......................................... G06F 15/167
(52) U.S. Cl. ..................... 375/214; 375/257; 709/213
(58) Field of Search .............................. 375/211, 214, 375/257; 710/129; 370/419, 420, 421; 709/213

(56) References Cited

U.S. PATENT DOCUMENTS

| | | | | |
|---|---|---|---|---|
| 5,838,932 A | * | 11/1998 | Alzien | 710/314 |
| 6,125,421 A | * | 9/2000 | Roy | 711/5 |
| 2003/0191809 A1 | * | 10/2003 | Mosley et al. | 709/213 |

* cited by examiner

*Primary Examiner*—Amanda T. Le
(74) *Attorney, Agent, or Firm*—Blakely, Sokoloff, Taylor & Zafman LLP

(57) ABSTRACT

A signal repeater for use between a serial data line and a peripheral device is disclosed. The signal repeater receives bus signals on the serial data line at a first voltage and translates the bus signal into a device signal of a second voltage. Also, the signal repeater is operative to receives device signals from the device at the second voltage and translates the device signal into a bus signal at the first voltage.

21 Claims, 3 Drawing Sheets

SIGNAL REPEATER FOR VOLTAGE INTOLERANT COMPONENTS USED IN A SERIAL DATA LINE

BACKGROUND OF THE INVENTION

1. Field of the Invention

The present invention relates to signal repeaters used in conjunction with a serial data line, and more particularly, to a signal repeater that is able to buffer variations in signal voltage.

2. Background Information

The Universal Serial Bus (USB) is a serial data line that supports data exchange between a host computer (USB host) and a wide range of simultaneously accessible peripherals (USB devices). The USB physical interconnect is a tiered star topology. A hub is at the center of each star. Each connection is a point-to-point connection between the USB host and a hub or a USB device, or a hub connected to another hub or USB device. FIG. 1 illustrates the topology of the USB. The USB host contains host controllers that provide access to the USB devices in the system.

The USB specification requires that USB devices be able to withstand voltages of up to 5.25 volts on their signal lines indefinitely. Although nominally, signaling on a USB connection should never exceed 5 volts, because of voltage spikes, reflections, short circuits in the connection, and other anomalies, the voltage on the USB connection may sometimes exceed 5 volts. Most current USB devices are built using 5 volt tolerant processes, therefore, this requirement in the USB specification is not problematic.

However, many semiconductor manufacturing companies are migrating to a 5 volt intolerant process. In other words, as process geometries move to 0.35 micron and lower, a 5.25 volt input to such an integrated device will prove catastrophic.

Currently, the most common solution for providing USB devices that can tolerate 5.25 volts on the signal lines is through the use of various forms of overvoltage crow bar circuits. However, the overvoltage crow bar circuits may not afford the necessary voltage protection and sometimes require routing a controlled impedance line through the integrated circuit.

SUMMARY OF THE INVENTION

A method that includes receiving bus signals having a first voltage from a serial data line. The bus signals are converted from the first voltage into a device signal having a second voltage. Finally, the device signal is provided to a device.

BRIEF DESCRIPTION OF DRAWINGS

The present invention will be described below in conjunction with the following Figures, wherein.

DETAILED DESCRIPTION OF THE INVENTION

The present invention is a signal repeater that can be used as a voltage buffer between a USB termination and 5 volt intolerant devices (typically implemented in silicon). The function of the signal repeater is to receive signals from the USB source termination and lower the signal voltage to a voltage level appropriate for the 5 volt intolerant device. Typically, the 5 volt intolerant device is a 3.3 volt (or lower) CMOS integrated circuit. Additionally, the signal repeater can function to receive signals from the 5 volt intolerant device and, if necessary, raise the signal voltage. More generally, the present invention can be used to receive a signal at a first voltage and output a signal that is higher or lower than the first voltage.

Figure 1:
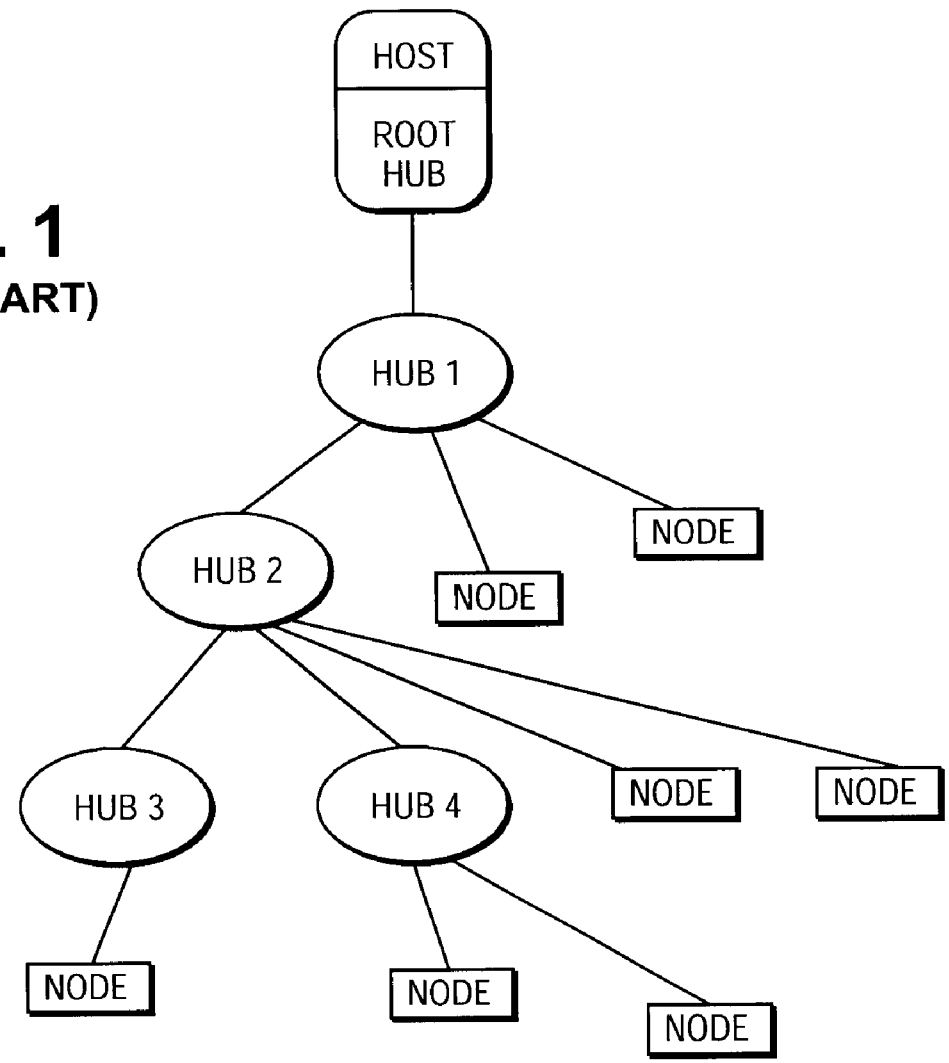
FIG. 1 is a schematic diagram of the USB topology.
Figure 2:
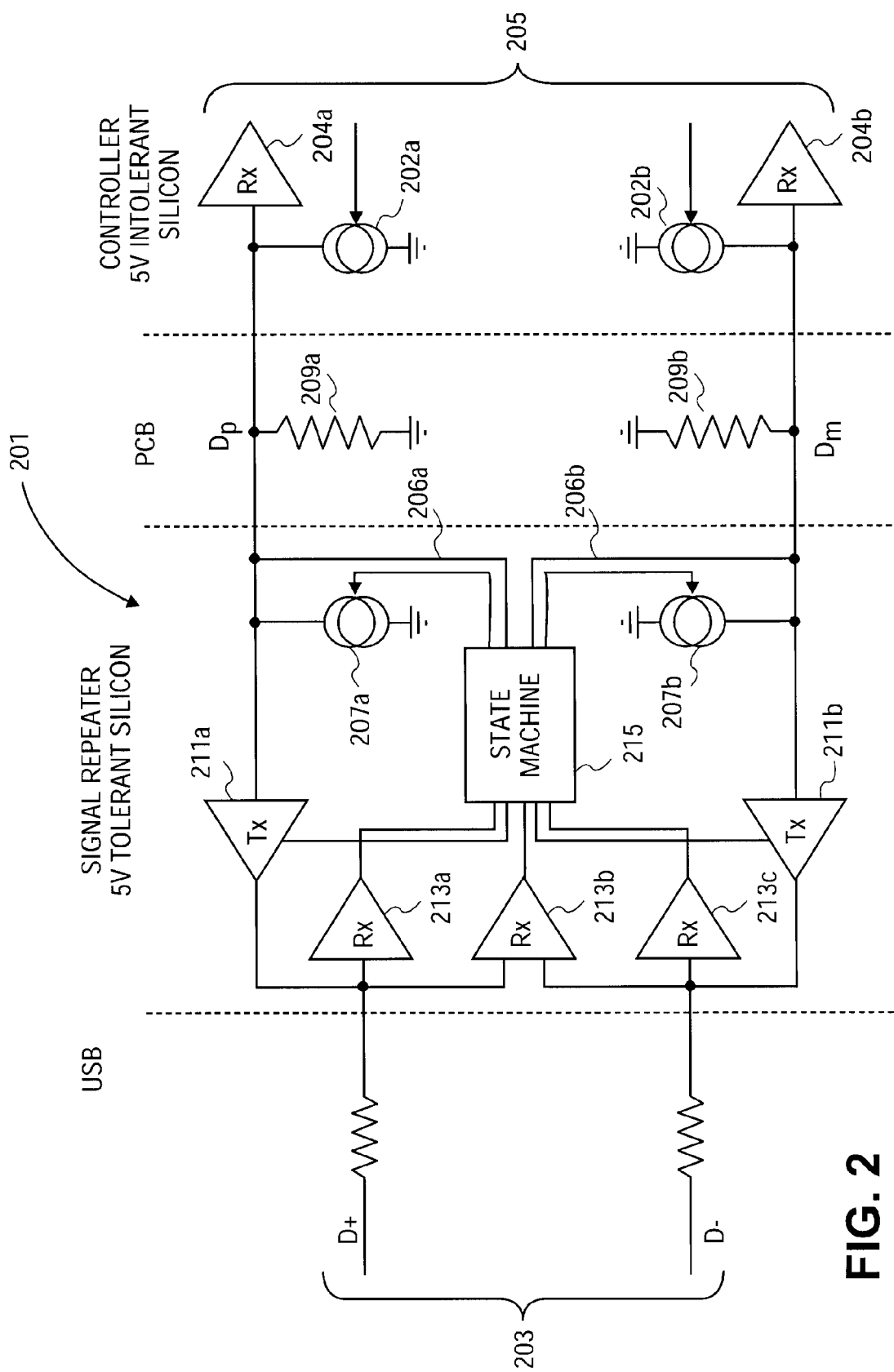
FIG. 2 is a schematic diagram of a signal repeater formed in accordance with the present invention.

FIG. 2 illustrates the preferred embodiment of a signal repeater 201 formed in accordance with the present invention. The signal repeater 201 is typically placed between a standard USB source termination 203 and a 5 volt intolerant device 205. In this particular embodiment, the 5 volt intolerant device 205 is a USB host controller, but can be any USB peripheral device.

The signal repeater 201, which is manufactured from 5 volt tolerant silicon, includes two current sources 207a and 207b, two transmitters 211a and 211b, two receivers 213a and 213c, differential receiver 213b, and state machine 215. The two transmitters 211a and 211b taken together are known as a composite transmitter. The two current sources 207a and 207b taken together are known as a composite current source.

Additionally, resistors 209a and 209b are placed between the signal repeater 201 and the 5 volt intolerant device 205. Resistor 209a is connected between a $D_p$ line and ground and resistor 209b is connected between a $D_m$ line and ground. The $D_p$ line and the $D_m$ line will carry signals to and from the 5 volt intolerant device 205. Typically, the resistors 209a and 209b will be placed on a printed circuit board (PCB) that carries the 5 volt intolerant device 205. Alternatively, the resistors 209a and 209b may be formed within the integrated circuit that carries the signal repeater 201. It is currently contemplated that the signal repeater 201 will be a silicon part that will be integrated with the PCB's of various 5 volt intolerant devices. Additionally, the resistors 209A and 209B can double as terminations, if necessary.

The 5 volt intolerant device 205 includes conventional current sources 202a and 202b and conventional receivers 204a and 204b. The receivers 204a and 204b are used to receive signals from the USB source termination 203 via the signal repeater 201, and more particularly, the $D_p$ and $D_m$ lines. Similarly, the current sources 202a and 202b are used to transmit signals onto the USB source termination 203 via the signal repeater 201 and the $D_p$ and $D_m$ lines.

The standard USB source termination 203 includes a D+ line and a D− line. This is also referred to as a serial data line or serial data line pair. The D+ line is input into receiver 213a and differential receiver 213b. The D− line is input into differential receiver 213b and receiver 213c.

The operation of the signal repeater is as follows with reference to FIGS. 2 and 3. For signals that are to be transmitted by the 5 volt intolerant device 205, the current sources 202a and 202b selectively inject a current onto the $D_p$ and $D_m$ lines, respectively. Signals that are received or transmitted by the 5 volt intolerant device 205 are referred to herein as device signals. Signals that are placed onto or received from the USB source termination 203 are referred to herein as bus signals.

The injected current is translated into voltage by the resistors 209a and 209b. The magnitude of the voltage placed onto lines $D_p$ and $D_m$ is dependent upon the combination of values of the current sources 202a and 202b and the values of the resistors 209a and 209b. In the preferred embodiment, the voltage to be input to the signal repeater by the 5 volt intolerant device 205 is 1.8 or 2.5 volts, requiring the current sources 202a and 202b to output 20 milliamps and resistors 209a and 209b having a value of about 90 or 125 ohms, respectively. When current is injected onto a $D_p$ or $D_m$ line, this is referred to as "high", corresponding to the voltage on the line relative to ground. When current is not injected onto a $D_p$ or $D_m$ line, this is referred to as "low", corresponding to the voltage on the line relative to ground. Furthermore, the transmitters 211a and 211b nominally have infinite input impedance. Therefore, all current injected by the current sources 202a and 202b pass through the resistors 209a and 209b to ground. Alternatively, the current sources 202a and 202b and the resistors 209a and 209b can be replaced by voltage mode drivers that directly drive the desired voltage of 1.8 or 2.5 volts onto the $D_p$ and $D_m$ lines.

The state machine 215 has sensing lines 206a and 206b that monitor the voltage level of the device signal on the $D_p$ and $D_m$ lines leading from the 5 volt intolerant silicon 205. In this embodiment, the device signal is digital and can be in one of four states: "J" state, "K" state, "$ND_{high}$" state, and "$ND_{low}$" state. The ND nomenclature refers to the "non-differential" in voltage between the $D_p$ and $D_m$ lines. The possible states of the device signal are also known as device signal states.

The J state is when $D_p$ is high and $D_m$ is low. The K state is when $D_p$ is low and $D_m$ is high. The $ND_{high}$ state is when $D_p$ is high and $D_m$ is high. The $ND_{low}$ state is when $D_p$ is low and $D_m$ is low. When no data is being passed from either the 5 volt intolerant device 205 or the USB source termination 203, the signal repeater 201 is in a quiescent state ($QS_{si}$) of $ND_{low}$.

The device signal is typically formatted into discrete data packets as specified by the USB specification. The first bit of a data packet that will be transmitted by the 5 volt intolerant device 205 will always be a transition to the K state. Note that the USB specification requires an initial transition to K state to signal the start of a data packet. This transition will be monitored by the state machine 215. FIG. 3 shows the state machine layout for the signal repeater 201. Inputs from the USB environment have been subscripted USB, while inputs from the 5 volt intolerant device have been subscripted Si.

Figure 3:
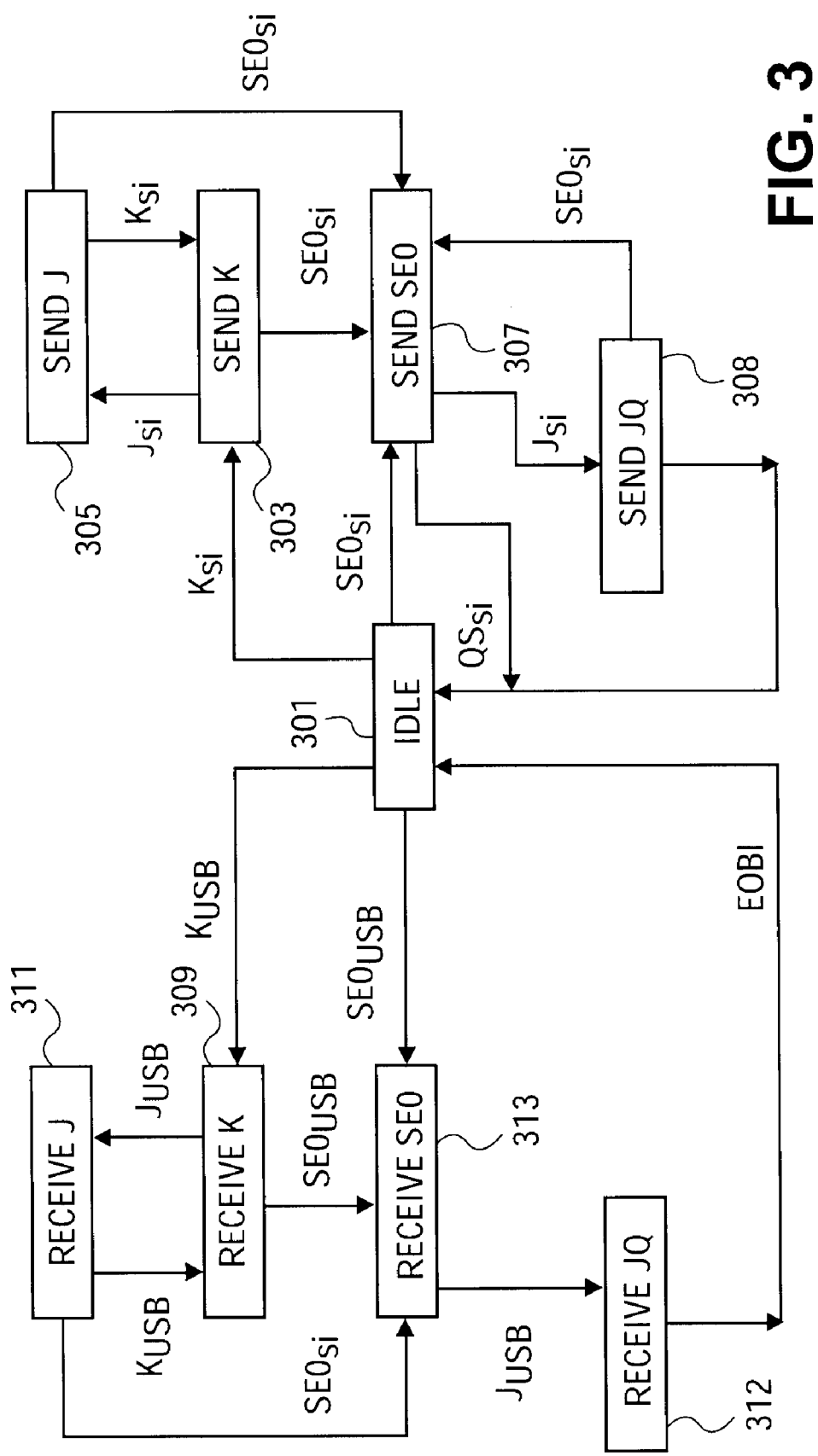
FIG. 3 is an implementation of a state machine formed in accordance with the present invention.

As seen in FIG. 3, when a K state is monitored on the $D_p$ and $D_m$ lines by the state machine 215, the state machine 215 is configured to transition from an idle state 301 to a send K state 303. During the send K state 303, a control signal is sent to transmitter 211b to drive a high voltage and a control signal is sent to transmitter 211a to drive a low voltage. This causes transmitter 211b to place a voltage onto the D– line on the USB source termination 203. Typically, the voltage that is placed on the D– line is 3.3 volts. Transmitter 211a places a zero voltage of the D+ line on the USB source termination 203. Therefore, nominally, the D+ line is at ground.

The state machine 215 continues to monitor the output from the 5 volt intolerant device 205 for additional transitions in state. If the 5 volt intolerant device 205 outputs a J state using current sources 202a and 202b (current source 202a on and current source 202b off), then the state machine 215 will identify that change in state and move to the send J state 305. During the send J state 305, a control signal is sent to transmitter 211b to drive a low voltage and a control signal is sent to transmitter 211a to drive a high voltage. This causes transmitter 211a to place a voltage onto the D+ line on the USB source termination 203. Typically, the voltage placed on the D+ line is 3.3 volts. Transmitter 211b places a zero voltage onto the D– line on the USB source termination 203. Therefore, nominally, the D– line is at ground. This process of alternating from send J state 305 and send K state 303 continues until the entire data packet to be sent by the 5 volt intolerant device 205 is completed.

In accordance with the USB specification, a "SE0" signal followed by a J state is used to signal the end-of-packet (EOP). In accordance with the present invention, when a SE0 signal is to be sent by the 5 volt intolerant device 205, the 5 volt intolerant device 205 causes current sources 202a and 202b to activate, thereby causing the $ND_{high}$ state on $D_p$ and $D_m$. Next, driving $D_p$ and $D_m$ to the J state for one bit time completes the EOP signal.

Alternatively, the SE0 signal could be signaled by a higher frequency differential code, for example, a "fast JK signal", where a J state and a K state each occur for one-half of a bit time in succession. Indeed, any number of different protocols can be used to signal the SE0 state on the $D_p$ and $D_m$ lines. For example, a fast JKJK signal, where a J state for one-quarter of a bit time, followed by a K state for one-quarter of a bit time, followed by a second J state for one-quarter of a bit time, and finally followed by a second K state for one-quarter of a bit time. However, it is necessary that the state machine 215 be aware of the protocol used for the SE0 state.

As noted above, in the preferred embodiment, the SE0 signal dictates that both data lines $D_p$ and $D_m$ are driven to high to the $ND_{high}$ state. Thus, as seen in FIG. 3, when the state machine 215 monitors that a SE0 signal is received from the 5 volt intolerant device 205 (by having both current sources 202a and 202b active), a send SE0 state 307 is invoked. During the send SE0 state 307, a control signal is sent to transmitter 211b to drive a zero voltage and a control signal is sent to transmitter 211a to drive a zero voltage. This causes transmitter 211a not to place any voltage onto the D+ line on the USB source termination 203. Similarly, transmitter 211b does not place any voltage onto the D– line on the USB source termination 203. Therefore, both the D+ line and the D– line are nominally at ground.

After the SE0 state has been sent for two bit times, the state machine 215 goes to a send JQ state 308. In the send JQ state 308, transmitter 211a activates and places 3.3 volts onto the D+ line on the USB source termination 203 for one bit time. However, transmitter 211b places a zero voltage onto the D– line on the USB source termination 203. From the send JQ state 308, the state machine 215 returns to the idle state 301, unless the 5 volt intolerant device 205 wishes to transmit another SE0 signal, at which point, the state machine 215 moves to the send SE0 state 307.

Further, in certain instances, the SE0 signal may not be followed by the J state. Rather the SE0 signal continues for many bit times. This continuous SE0 signal is used to signal a reset or disconnect on the USB connection. Thus, at send SE0 state 307, the SE0 signal ($ND_{high}$) can be sent continuously.

In the above manner, low voltage device signals output by the 5 volt intolerant device 205 are converted by the signal repeater 201 to a high voltage bus signal (relative to the 5 volt intolerant device 205 output of 1.8 or 2.5 volts) that complies with USB specification and which is placed onto the D+ and D– lines of the USB source termination 203.

Below is a table that summarizes and illustrates the various voltages when the 5 volt intolerant device 205 is driving a device signal onto the USB source termination 203. This table is for full speed operation. For low speed operation the voltages on D+ and D– are interchanged.

|  | $D_p$ | $D_m$ | D+ | D− |
|---|---|---|---|---|
| J-State | High | Low | High | Low |
| K-State | Low | High | Low | High |
| $ND_{high}$ | High | High | Low | Low |
| $ND_{low}$ | Low | Low | Tri-state | Tri-state |

For device signals that are to be received by the 5 volt intolerant device 205, the signal repeater 201 receives the bus signals from the USB source termination 203, and outputs a device signal for reception by the receivers 204a and 204b of the 5 volt intolerant device 205.

As seen in FIG. 2, when a bus signal is received on the USB source termination 203, the D+ line and the D− line is input into the differential receiver 213b. The differential receiver 213b can receive the D+ and D− inputs and provides a differential receiver output that is their difference.

The bus signal can be in one of three states: "J" state, "K" state, and "SE0" state. The SE nomenclature refers to the term "single ended" commonly used in the art. The possible states of the bus signal are also referred to as the bus signal state. The J state is when D+ is high and D− is low. The K state is when D+ is low and D− is high. The SE0 state is when D+ is low and D− is low. When no data is being carried on the USB source termination 203, in accordance with the USB specification, the USB source termination 203 is in its quiescent J state.

If a J state is on the USB source termination 203, the D+ line is high and the D− line is low. This results in a differential receiver output to the state machine 215 that the state machine 215 will interpret as the J state. If a K state is on the USB source termination 203, the D+ line is high and the D− line is low. This results in a differential receiver output to the state machine 215 that the state machine 215 will interpret as the K state.

The differential receiver 213b is normally designed to be only operative if the D+ and D− inputs are sufficiently different in their voltage levels, for example, preferably a 200 millivolt difference. As noted above, the EOP signal comprises a SE0 signal followed by a J state or a K state for one bit time. In the case of the USB source termination, the SE0 signal requires the SE0 state, which in turn requires that both D+ and D− be low. In such a situation, the differential receiver 213b will be inoperable. Instead, the receivers 213a and 213b can be used to detect the SE0 state. The receivers 213a and 213b provide a receiver output to the state machine 215 as to the signal level on the D+ line and D− line, respectively. The state machine 215 can determine if both receivers 213a and 213c are outputting a receiver output that indicates that a SE0 state is on the USB source termination 203.

An illustration of data being received from the USB source termination 203 by the signal repeater 201 will now be described. The first bit of the data packet that will be received by the signal repeater 201 will be a transition to the K state. Note that the USB specification requires an initial transition to K state (from the quiescent J state) to signal the start of a data packet. This transition will be monitored by the state machine 215 via the differential receiver 213b.

As seen in FIG. 3, when a K state is indicated by the differential receiver 213b, the state machine 215 is configured to transition from an idle state 301 to a receive K state 309. During the receive K state 309, a control signal is sent to current source 207b to become active (from its quiescent $ND_{low}$ status). This causes only current source 207b to inject a current onto the $D_m$ line. Further, current source 207a does not inject a current onto the $D_p$ line. The current from current source 207b is translated into voltage by the resistor 209b. Nominally, the receivers 204a and 204b have an infinite input impedance. Therefore, all current injected by the current sources 207a and 207b pass through the resistors 209a and 209b to ground. The receivers 204b and 204a will then receive as input a high signal on the $D_m$ line and a low signal on the $D_p$ line, respectively. Additional circuitry on the 5 volt intolerant device 205 can interpret this combination as being a K state.

The state machine 215 continues to monitor the USB source termination 203 for additional bits (transitions in state). If the USB source termination 203 carries a J state, then the differential receiver 213b will forward to the state machine 215 a differential receiver output that is indicative of a J state being on the USB source termination 203. The state machine 215 will then move to a receive J state 311. During the receive J state 311, a control signal is sent to current source 207b to deactivate and a control signal is sent to current source 207a to activate. This causes current source 207a to inject a current onto the $D_p$ line. Further, current source 207b does not inject a current onto the $D_m$ line. The current from the current source 207a is translated into voltage by the resistor 209a. The receivers 204b and 204a will then receive as input a low signal on the $D_m$ line and a high signal on the $D_p$ line, respectively. Additional circuitry on the 5 volt intolerant device can interpret this combination as being a J state.

This process of going to and from receive J state 311 and receive K state 309 continues until the entire data packet to be received by the signal repeater 201 from the USB source termination 203 is completed. In accordance with the USB specification, a SE0 state followed by the J state is used to signal the EOP. Thus, as seen in FIG. 3, when the state machine 215 monitors that a SE0 signal is received on the USB source termination 203 (by having both receivers 213a and 213c output a low signal), a receive SE0 state 313 is invoked. During the receive SE0 state 313, a control signal is sent to both current sources 207a and 207b to activate or remain active. This causes voltage to be placed onto the $D_p$ and $D_m$ line, which will be sensed by the receivers 204a and 204b of the 5 volt intolerant device 205. Further, the 5 volt intolerant device is programmed to recognize that when both $D_p$ and $D_m$ are high, this corresponds to a SE0 signal from the USB source termination 203. Alternatively, as noted above, this state could be signaled by a higher frequency differential code, for example, a "fast JK signal", where a J state and a K state each occur for one-half of a bit time.

After the SE0 state has been sent, the state machine 215 then goes to the receive JQ state 312. After the receive JQ state 312 (which lasts for one bit time), the state machine 215 goes back into idle state 301 by placing lines $D_p$ and $D_m$ in the quiescent $ND_{low}$. Further, a quiescent J state is inferred onto the D+ and D− lines.

Below is a table that summarizes and illustrates the various voltages when a bus signal is received on the USB source termination 203. This table is for full speed operation. For low speed operation the voltages on D+ and D− are interchanged.

|  | D+ | D− | $D_p$ | $D_m$ |
|---|---|---|---|---|
| J-State | High | Low | High | Low |
| K-State | Low | High | Low | High |
| SE0 State | Low | Low | High | High |
| Quiescent J | High Floating | Low | Low | Low |

The signal repeater 201 described herein provides a low cost method for meeting the USB specification's requirements. Prior art overvoltage crow bars cannot activate on a 3.6 volt USB signal or a 4.7 volt USB reflection. In contrast, the signal repeater 201 of the present invention scales with the voltage tolerance of the USB 5 volt intolerant device process and is limited only by the amount of noise present on the printed circuit board.

In the above manner, high voltage signals carried by the USB source termination 203 are converted by the signal repeater 201 to a low voltage signal (relative to the voltages carried on the USB source termination 203) that can be safely handled by the 5 volt intolerant device 205.

Note that although current sources 207a and 207b are used as the drivers for sending signals to the 5 volt intolerant device 205, a voltage mode driver could also be used, though implementation may be more difficult. Similarly, although current sources 202a and 202b are used as the drivers for sending signals to the signal repeater 201, a voltage mode driver could also be used, though implementation may be more difficult.

Importantly, the signal repeater 201 can also be placed adjacent to a USB connection. This placement is desirable for several reasons. First, the USB source termination 203 can be terminated at the USB connector, making it easier for a mother board or a USB device to reject any noise coupled onto the USB cable. Further, the USB traces on a printed circuit board are quite short, reducing USB line loading and (if the traces are short enough) minimizing the impact of any impedance mismatch between the USB cable and the traces. Moreover, the route between the repeater 201 and the 5 volt intolerant device 205 is wholly under the board designer's control and is not subject to the USB specifications timing or impedance requirements. Thus, the layout or impedance that best suits the printed circuit board can be used, rather than the layout that best suits the USB environment.

Additionally, the design of the signal repeater 201 is fairly simple, uses a small number of gates, and fits on a 6 pin package or an 8 pin package. Per-port repeater costs for USB hubs and host controllers can be reduced by putting multiple repeaters into a single package. In addition, other conventional devices such as electrostatic discharge protection circuit, an electrical fast transient protection circuit, and electromagnetic interference protection circuit may be added to the signal repeater.

While the preferred embodiment of the invention has been illustrated and described, it will be appreciated that various changes can be made therein without departing from the spirit and scope of the invention.

What is claimed is:

1. A method comprising:
   receiving bus signals from a serial bus, said bus signals having a first voltage, said bus signals in the form of digital data having a J state or a K state;
   converting said bus signals having a first voltage into a device signal having a second voltage; and
   providing said device signal having said second voltage to a device, said device having a $D_p$ input and a $D_m$ input, wherein
      if a J state is detected from said serial bus, forming said device signal by placing said second voltage onto said $D_p$ input; and
      if a K state is detected from said serial bus, forming said device signal by placing said second voltage onto said $D_m$ input.

2. The method of claim 1 wherein said forming said device signal in response to a J state is accomplished by injecting a current onto said $D_p$ input.

3. The method of claim 1 wherein said forming said device signal in response to a K state is accomplished by injecting a current onto said $D_m$ input.

4. The method of claim 1 wherein said bus signals may also include a SE0 state, said SE0 state causing said device signal to be formed by placing a second voltage onto said $D_p$ input and said $D_m$ input.

5. The method of claim 1 wherein said bus signals may also include a SE0 state, said SE0 state being a fast JK signal.

6. A method comprising:
   receiving device signals having a first voltage from a device, said device signals in the form of digital data having a J state or a K state;
   converting said device signals having a first voltage into a bus signal having a second voltage; and
   applying said bus signal having said second voltage to a serial bus, said serial bus having a D+ line and a D− line, wherein
      if a J state is detected from said device, forming said bus signal by placing said second voltage onto said D+ line; and
      if a K state is detected from said device, forming said bus signal by placing said second voltage onto said D− line.

7. The method of claim 6 wherein said serial bus is a Universal Serial Bus (USB).

8. The method of claim 6 wherein said device signals are placed on a $D_p$ line and a $D_m$ line, wherein said device signals may include a SE0 state, said SE0 state causing said second voltage to be placed on said $D_p$ line and said $D_m$ line.

9. The method of claim 6 wherein said device signals are placed on a $D_p$ line and a $D_m$ line, wherein said device signals may include a SE0 state, said SE0 state causing a fast JK signal to be placed on said $D_p$ line and said $D_m$ line.

10. A method for handling communications between a serial bus and a device comprising:
   for communications from said serial bus to said device:
      receiving bus signals from a serial bus, said bus signals having a first voltage, said bus signals in the form of digital data having a J state or a K state;
      converting said bus signals having a first voltage into a device signal having a second voltage; and
      providing said device signal having said second voltage to a device, said device having a $D_p$ input and a $D_m$ input, wherein
         if a J state is detected from said serial bus, forming said device signal by placing said second voltage onto said $D_p$ input; and
         if a K state is detected from said serial bus, forming said device signal by placing said second voltage onto said $D_m$ input; and
   for communications from said device to said serial bus:
      receiving said device signal having said second voltage from said device;
      converting said device signal having a second voltage into said bus signal having said first voltage; and
      applying said bus signal having said first voltage to said serial bus.

11. The method of claim 10 wherein said serial bus is a Universal Serial Bus (USB) having a D+ line and a D− line and said device signals are in the form of digital data having a J state or a K state, said method further comprising:
   if a J state is detected from said device, forming said bus signal by placing said first voltage onto said D+ line; and if a K state is detected from said device, forming said bus signal by placing said first voltage onto said D− line.

12. The method of claim 10 wherein said forming said device signal in response to a J state is accomplished by injecting a current onto said $D_p$ line.

13. The method of claim 10 wherein said forming said device signal in response to a K state is accomplished by injecting a current onto said $D_m$ line.

14. A signal repeater for repeating signals from a device to a serial bus comprising:

said serial bus comprising a D+ line and a D− line;

a state machine for monitoring the output of said device for a device signal provided on a $D_p$ line and a $D_m$ line, said device signal having a device signal state represented by a first voltage level, said state machine generating a control signal that is dependent upon said device signal state; and a composite transmitter comprising a first transmitter coupled to said D+ line and a second transmitter coupled to said D− line, said composite transmitter to receive said control signal and, based upon said control signal, generating a bus signal onto said serial bus, said bus signal having a bus signal state represented by a second voltage level, wherein said device signal state being a $ND_{high}$ state when said $D_p$ line is high and said $D_m$ line is high, wherein when said device signal state is a $ND_{high}$ state, said first transmitter causes said D+ line to be low and said second transmitter causes said D− line to be low.

15. The signal repeater of claim 14 wherein said device signal state being a J state when said $D_p$ line is high and said $D_m$ line is low, said device signal state being a K state when said $D_p$ line is low and said $D_m$ line is high, wherein when said device signal state is a J state, said first transmitter causes said D+ line to be high and said second transmitter causes said D− line to be low, wherein when said device signal state is a K state, said first transmitter causes said D+ line to be low and said second transmitter causes said D− to be high.

16. A signal repeater for repeating signals from a serial bus to a device comprising:

a state machine for monitoring a bus signal carried on said serial bus, said bus signal having a bus signal state represented by a first voltage level, said state machine generating a control signal that is dependent upon said bus signal state; and a composite current source that receives said control signal and, based upon said control signal, delivering a device signal to said device, said device signal having a device signal state represented by a second voltage level.

17. The signal repeater of claim 16 wherein said serial bus comprises a D+ line and a D− line, said bus signal state being in a J state when said D+ line is high and said D− line is low, said bus signal state being in a K state when said D+ line is high and said D− line is high, said signal repeater further including receiving means for monitoring the voltage on said D+ line and said D− line, said receiving means providing an indication to said state machine as to the voltage on said D+ line and said D− line.

18. The signal repeater of claim 17 wherein said composite current source includes a first current source coupled to a $D_p$ line of said device and a second current source coupled to a $D_m$ line of said device, further wherein when said bus signal state is a J state, said first current source causes said $D_p$ line to be high and said second current source causes said $D_m$ line to be low, wherein when said bus signal state is a K state, said first current source causes said $D_p$ line to be low and said second current source causes said $D_m$ line to be high.

19. The signal repeater of claim 18 wherein said bus signal state being a SE0 state when said D+ line is low and said D− line is low, wherein when said bus signal state is a SE0 state, said first current source causes said $D_p$ line to be high and said second current source causes said $D_m$ line to be high.

20. A signal repeater for repeating signals between a serial bus and a device comprising:

a state machine for monitoring said device for an outbound device signal having a device signal state represented by a first voltage level, said state machine generating a first control signal that is dependent upon said device signal state, said state machine also monitoring for an inbound bus signal carried on said serial bus, said inbound bus signal having a bus signal state represented by a second voltage level, said state machine generating a second control signal that is dependent upon said bus signal state;

a composite transmitter that receives said first control signal and, based upon said first control signal, generating an outbound bus signal onto said serial bus, said outbound bus signal having a bus signal state; and a composite current source that receives said second control signal and, based upon said second control signal, delivering an inbound device signal to said device, said inbound device signal having a device signal state.

21. An apparatus comprising:

a device for transmitting an outbound device signal at a first voltage level and receiving an inbound device signal at said first voltage level;

a serial bus for carrying an inbound bus signal at a second voltage level and carrying an outbound bus signal at said second voltage level;

a signal repeater located between said serial bus and said device comprising:

a state machine for monitoring said device for said outbound device signal having a device signal state, said state machine generating a first control signal that is dependent upon said device signal state, said state machine also monitoring for said inbound bus signal carried on said serial bus, said inbound bus signal having a bus signal state, said state machine generating a second control signal that is dependent upon said bus signal state;

a composite transmitter that receives said first control signal and, based upon said first control signal, generating said outbound bus signal onto said serial bus, said outbound bus signal having a bus signal state; and a composite current source that receives said second control signal and, based upon said second control signal, delivering said inbound device signal to said device, said inbound device signal having a device signal state.

* * * * *